US010815650B2

United States Patent
Hansen et al.

(10) Patent No.: US 10,815,650 B2
(45) Date of Patent: Oct. 27, 2020

(54) FAUCET WITH OFFSET VALVE

(71) Applicant: Kohler Co., Kohler, WI (US)

(72) Inventors: David E. Hansen, Howards Grove, WI (US); Rafael A. Rexach, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 120 days.

(21) Appl. No.: 15/940,463

(22) Filed: Mar. 29, 2018

(65) Prior Publication Data

US 2018/0216321 A1 Aug. 2, 2018

Related U.S. Application Data

(62) Division of application No. 15/389,778, filed on Dec. 23, 2016, now Pat. No. 10,604,918.

(60) Provisional application No. 62/272,015, filed on Dec. 28, 2015.

(51) Int. Cl.
*F16K 11/00* (2006.01)
*E03C 1/04* (2006.01)

(52) U.S. Cl.
CPC .......... *E03C 1/0403* (2013.01); *E03C 1/0404* (2013.01); *E03C 1/0412* (2013.01); *F16K 19/006* (2013.01); *E03C 2001/0415* (2013.01)

(58) Field of Classification Search
USPC .................... 137/625.41, 625.17; 4/695
See application file for complete search history.

(56) References Cited

U.S. PATENT DOCUMENTS

| | | | |
|---|---|---|---|
| 2,348,238 A | 5/1944 | Beeke et al. | |
| 2,538,835 A | 1/1951 | Harvey et al. | |
| 3,965,936 A | 6/1976 | Lyon | |
| 5,608,928 A | 3/1997 | Wang | |
| 6,183,636 B1 | 2/2001 | Bowers | |
| 6,371,163 B1* | 4/2002 | Kahle | E03C 1/0401 137/625.17 |
| 6,941,971 B1* | 9/2005 | Hsien | 137/801 |
| 7,467,753 B2 | 12/2008 | Ko | |
| 7,814,927 B2* | 10/2010 | Hansen | E03C 1/0403 137/315.12 |
| D713,508 S | 9/2014 | Downey | |
| 9,151,397 B2* | 10/2015 | Pinette | F16K 11/20 |
| D750,754 S | 3/2016 | Rexach | |
| 9,816,255 B2 | 11/2017 | Schurle | |
| 2009/0189108 A1* | 7/2009 | Ritter | E03C 1/0403 251/304 |
| 2013/0192686 A1* | 8/2013 | Zhu | E03C 1/0403 137/15.01 |

FOREIGN PATENT DOCUMENTS

CN 203034539 7/2013

* cited by examiner

*Primary Examiner* — John Fox
(74) *Attorney, Agent, or Firm* — Foley & Lardner LLP

(57) ABSTRACT

A faucet assembly includes a valve housing having a first side defining first and second openings, the second opening configured to receive a valve. The valve housing further includes a second side defining a third opening configured to receive at least one fluid inlet line and at least one fluid outlet line therethrough. The assembly further includes a cap configured to cover at least a portion of the third opening.

16 Claims, 10 Drawing Sheets

FAUCET WITH OFFSET VALVE

CROSS REFERENCE TO RELATED APPLICATIONS

This application is a Divisional of U.S. patent application Ser. No. 15/389,778, filed Dec. 23, 2016, which claims the benefit of and priority to U.S. Provisional Patent Application No. 62/272,015, filed Dec. 28, 2015, both of which are incorporated by reference herein in their entireties.

BACKGROUND

The present application relates generally to the field of faucets. More particularly, the present application relates to a faucet having a valve that is offset from the faucet body.

SUMMARY

According to an exemplary embodiment, a faucet assembly includes a faucet body having a mounting axis in the direction the faucet body projects from a mounting point, a valve housing projecting from the faucet body, and a valve disposed within the valve housing. The valve is configured to rotate about an axis parallel to and offset from the mounting axis.

In one aspect of the faucet assembly, the valve housing projects perpendicularly from the faucet body.

In one aspect of the faucet assembly, the valve is fluidly connected to at least one fluid inlet line and at least one fluid outlet line.

In one aspect of the faucet assembly, the at least one fluid inlet line and at least one fluid outlet line are rigid.

In one aspect of the faucet assembly, the valve housing further includes an opening configured to receive the at least one fluid inlet line and at least one fluid outlet line.

In one aspect of the faucet assembly, the valve housing further includes a cap configured to engage the opening of the valve housing.

In one aspect of the faucet assembly, the at least one fluid inlet line and at least one fluid outlet line include a first portion that extends in the direction of the mounting axis and a second portion that extends in the direction the valve housing projects from the faucet body.

In one aspect of the faucet assembly, the valve is a mixing valve.

In another embodiment, a faucet valve assembly includes a valve housing having first and second sides, wherein the first side of the valve housing defines first and second openings. The second side of the valve housing defines a third opening. A cap is configured to cover at least a portion of the third opening.

In another embodiment, a method of assembling a faucet includes inserting at least one fluid inlet line and at least one fluid outlet line through an opening in a cap, fluidly connecting the at least one fluid inlet line and at least one fluid outlet line to a valve, and inserting at least a portion of the at least one fluid inlet line and at least one fluid outlet line within the cap and a valve housing.

In one aspect of the method of assembling a faucet, the method further includes inserting the valve vertically into the valve housing.

In another embodiment, a faucet valve assembly includes a valve housing including a first side defining first and second openings, the second opening configured to receive a valve. The valve housing further includes a second side defining a third opening configured to receive at least one fluid inlet line and at least one fluid outlet line therethrough. The assembly further includes a cap configured to cover at least a portion of the third opening.

In another embodiment, a method of assembling a faucet includes inserting at least one fluid inlet line and at least one fluid outlet line through an opening of a cap. The method further includes inserting, into a valve housing, at least a portion of the at least one fluid inlet line and at least one fluid outlet line through an opening in the valve housing. The method further includes fluidly connecting the at least one fluid inlet line and at least one fluid outlet line to a valve and engaging the opening with the cap.

In another embodiment, a faucet valve assembly includes a base having an upper end. The assembly further includes a valve housing extending from the base and having a first side defining a first opening and a second opening. The valve housing further includes an opposing second side defining a third opening. The first opening is configured to receive the upper end of the base and the second opening is configured to receive a valve. The assembly further includes a fluid inlet line configured to be received through the third opening, the fluid inlet line defining a first portion and a second portion, the second portion disposed in the valve housing.

DETAILED DESCRIPTION

Referring to the FIGURES generally, various embodiments disclosed herein relate to a faucet assembly having a valve housing that contains or houses a valve such that the valve housing and valve are offset from the body. In such a configuration, a handle coupled to the valve may be configured to rotate about an axis that is substantially perpendicular to a surface to which the faucet is mounted (i.e., a mounting surface). According to an exemplary embodiment, the valve housing is offset horizontally relative to the body when in the mounted position and is connected to the body by a bridge portion.

Valve placement in faucets is limited by water inlet and outlet lines that have limited flexibility because the water lines cannot be inserted around tight angles in a faucet. Valve assemblies oriented perpendicular to the faucet body can be lengthened in the direction of the faucet body so the valve can reach a water line disposed mostly in the faucet body. However valves oriented parallel to and offset from the faucet body do not have the same structural features, instead requiring the water line itself to extend through the housing toward the valve. The faucet assembly in the present disclosure overcomes this limitation by including a valve housing projecting from the faucet body, with a coverable opening underneath for inserting water lines. This configurations allows for installation of a vertically-oriented valve offset from the faucet body.

Figure 1:
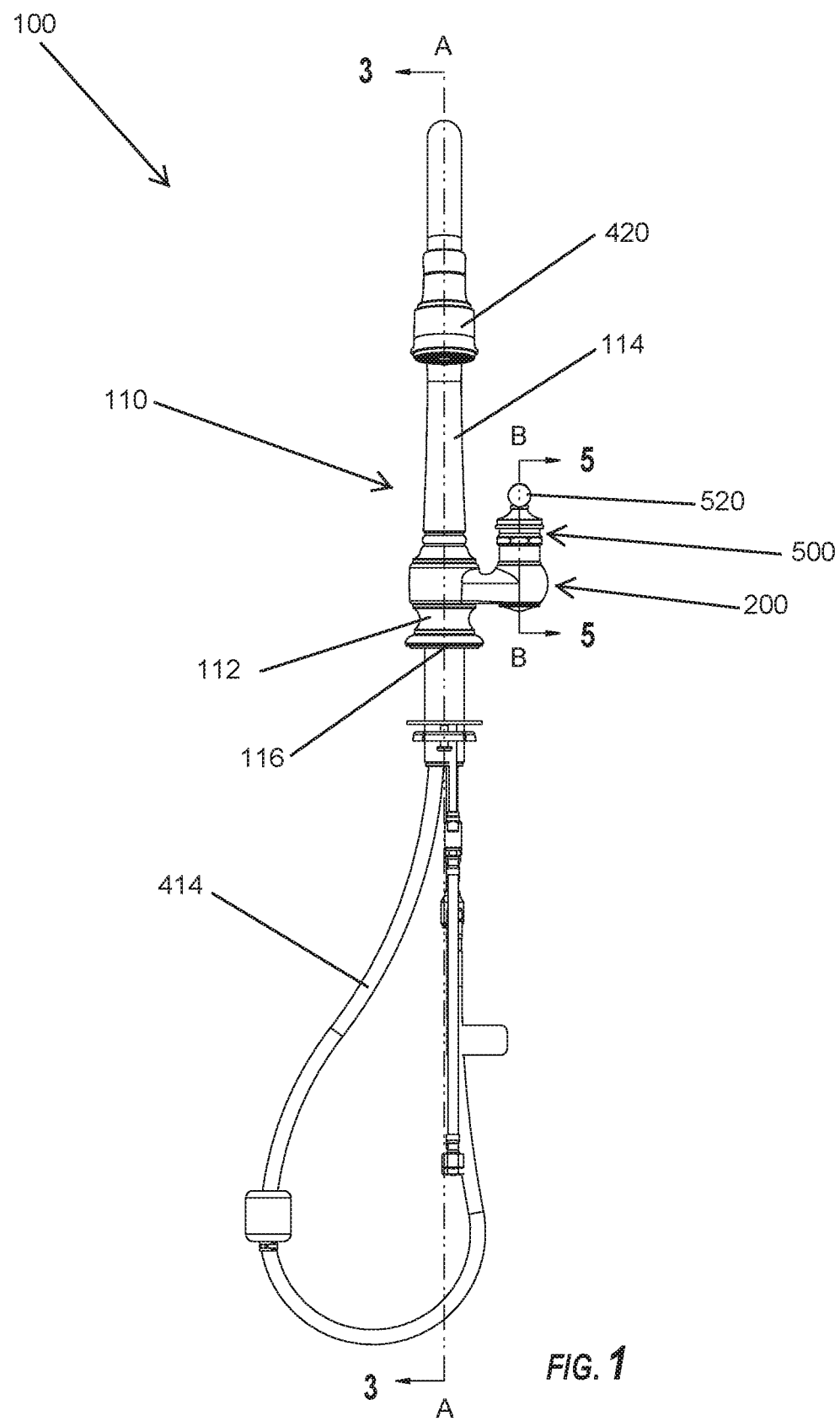
FIG. 1 is front elevation view of a faucet assembly according to an exemplary embodiment.
Figure 2:
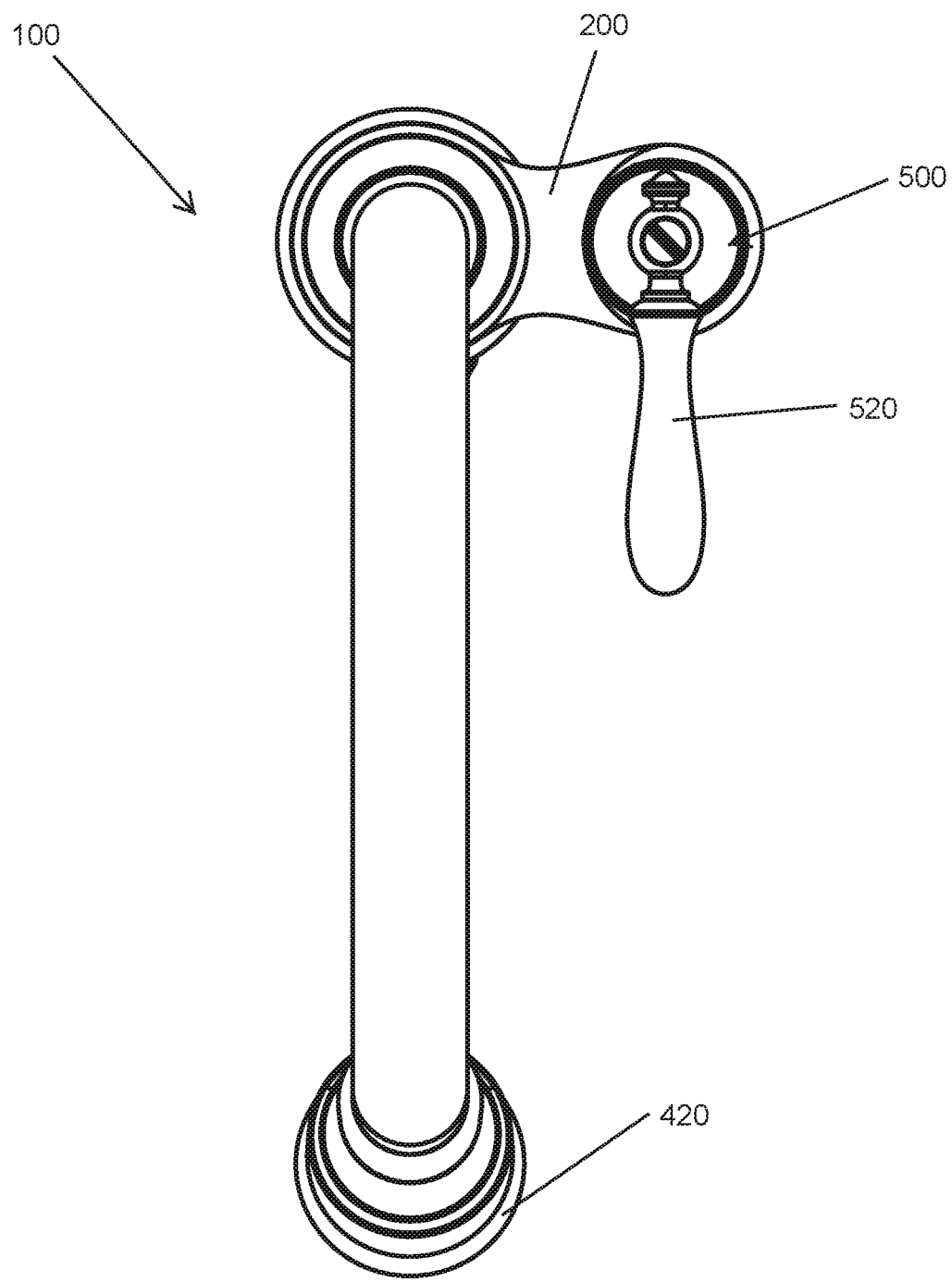
FIG. 2 is top plan view of a faucet assembly according to an exemplary embodiment.
Figure 3:
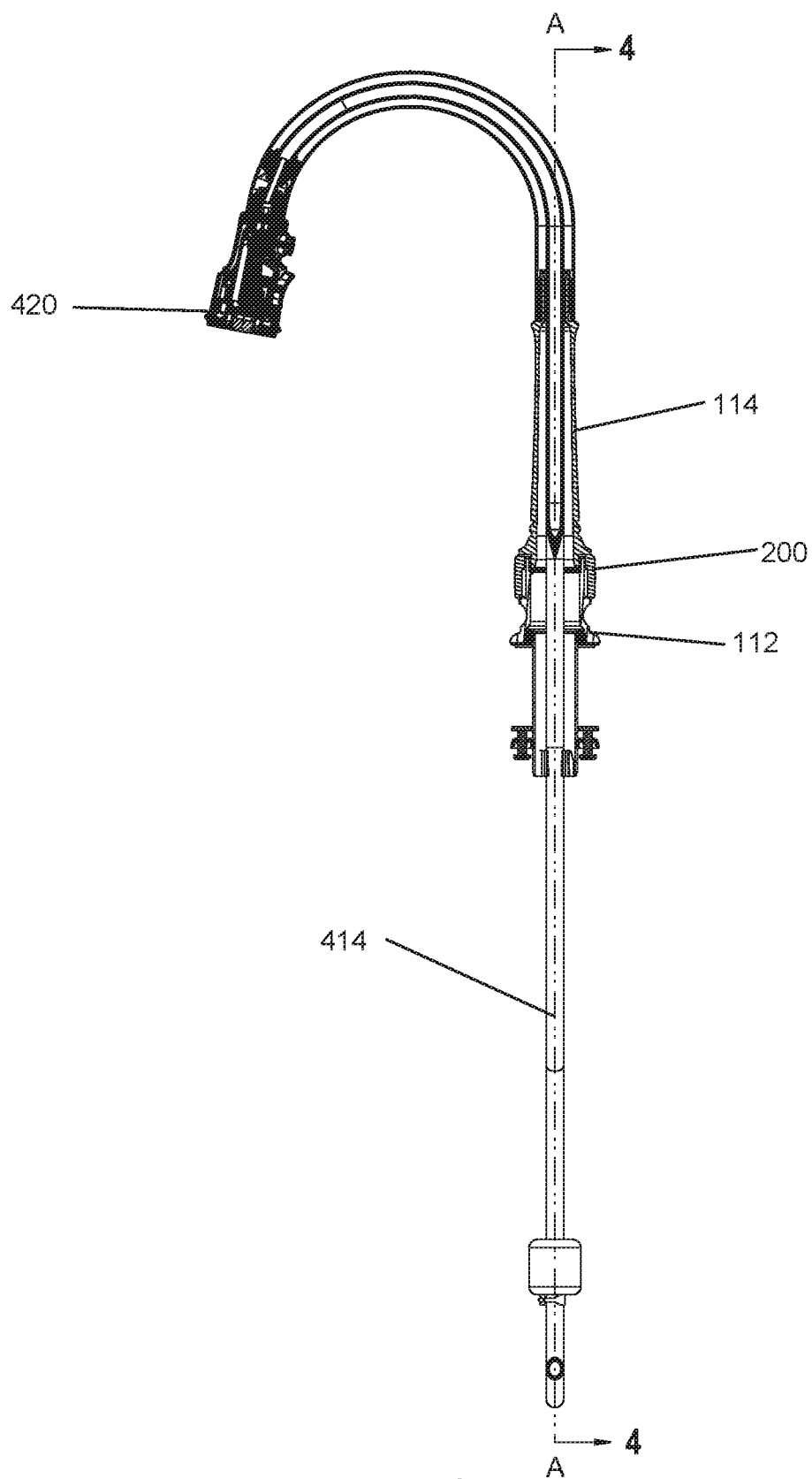
FIG. 3 is a cross-sectional view of a faucet assembly taken across line 3-3 in FIG. 1, according to an exemplary embodiment.

Referring to FIGS. 1-3, a faucet assembly 100 is shown according to an exemplary embodiment. The faucet assembly 100 includes a faucet body 110 and a valve housing 200. As shown in FIGS. 1 and 3, the faucet body 110 further includes a base 112 and a neck 114. The base 112 is configured to mount to a surface (not shown) at a mounting point 116. The base 112 defines a passage having a mounting axis A-A. The neck 114 defines a passage that projects along the mounting axis A-A (i.e., an axis that is perpendicular to a mounting surface such as a countertop to which the faucet is coupled). The neck 114 is configured to be coupled to an upper portion 112a of the base 112.

A valve housing 200 is disposed between the base 112 and the neck 114. As shown in FIGS. 1 and 2, the valve housing 200 projects substantially perpendicularly from the faucet body 110, although according to other exemplary embodiments, the valve housing 200 may project at other angles (e.g., at approximately a 10 degree incline or decline). The valve housing 200 receives a valve assembly 500 that includes a valve 510 (see, e.g., FIG. 4) and a handle 520. The valve 510 is configured to rotate about a valve axis B-B that is offset from and substantially parallel to the mounting axis A-A (e.g., the valve axis B-B or axis of rotation for the handle is perpendicular to a surface to which the faucet is mounted). According to an exemplary embodiment, the valve 510 is a mixing valve. The handle 520 is disposed at an end of the valve 510 and is configured to rotate about the valve axis B-B. The handle 520 is coupled to the valve 510 such that manipulating the handle 520 rotates the valve 510. According to an exemplary embodiment, the handle 520 is above the valve 510, although according to other exemplary embodiments, the handle 520 may be below the valve 510. As shown in FIG. 5, the handle 520 may be coupled to the valve 510 by a fastener 522 such as a screw or bolt, but the handle 520 may be coupled to the valve 510 by other types of fasteners (e.g., welds, rivets, adhesive, etc.).

Figure 4:
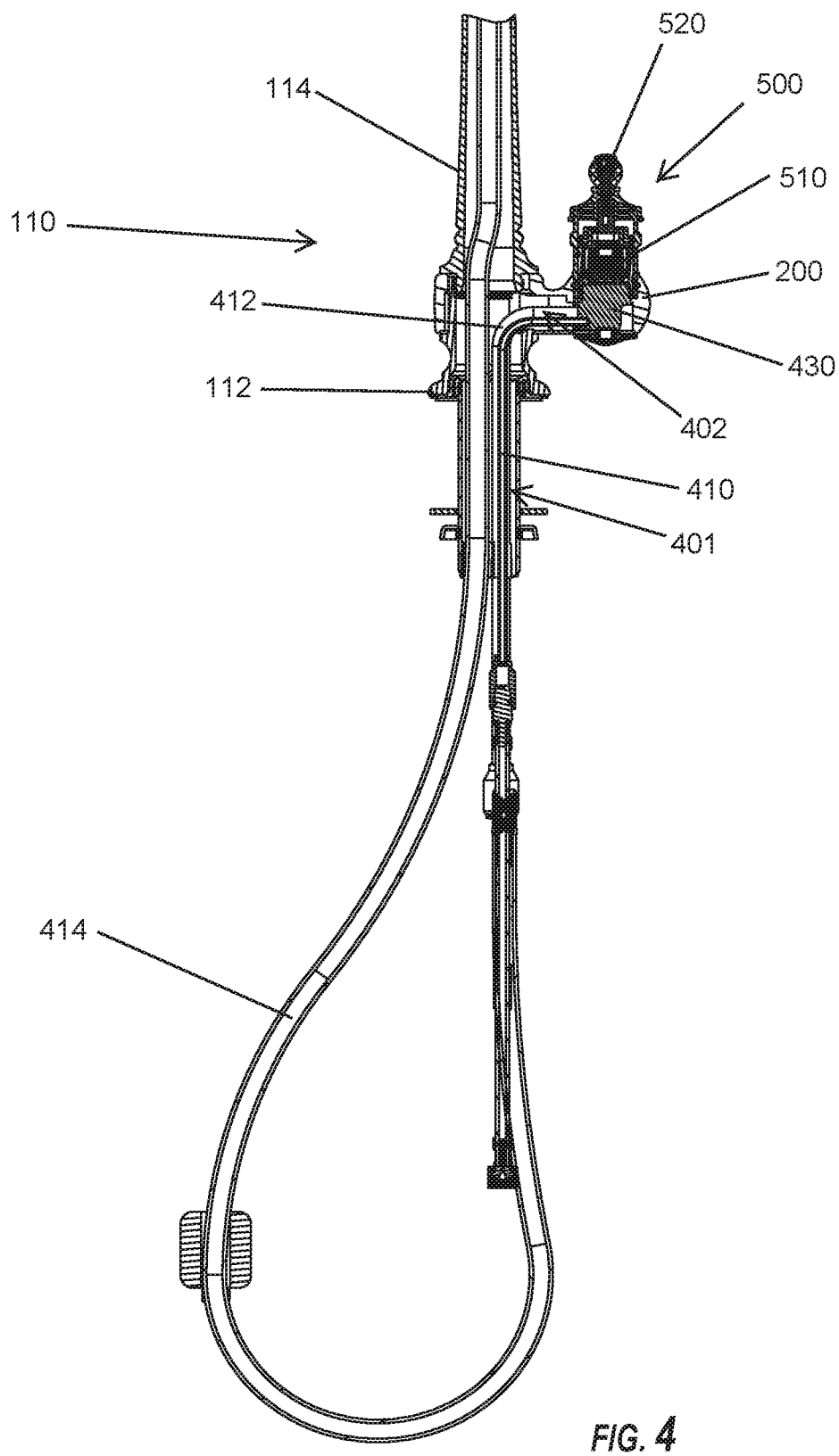
FIG. 4 is a cross-sectional view of a faucet assembly taken across line 4-4 in FIG. 3, according to an exemplary embodiment.
Figure 5:
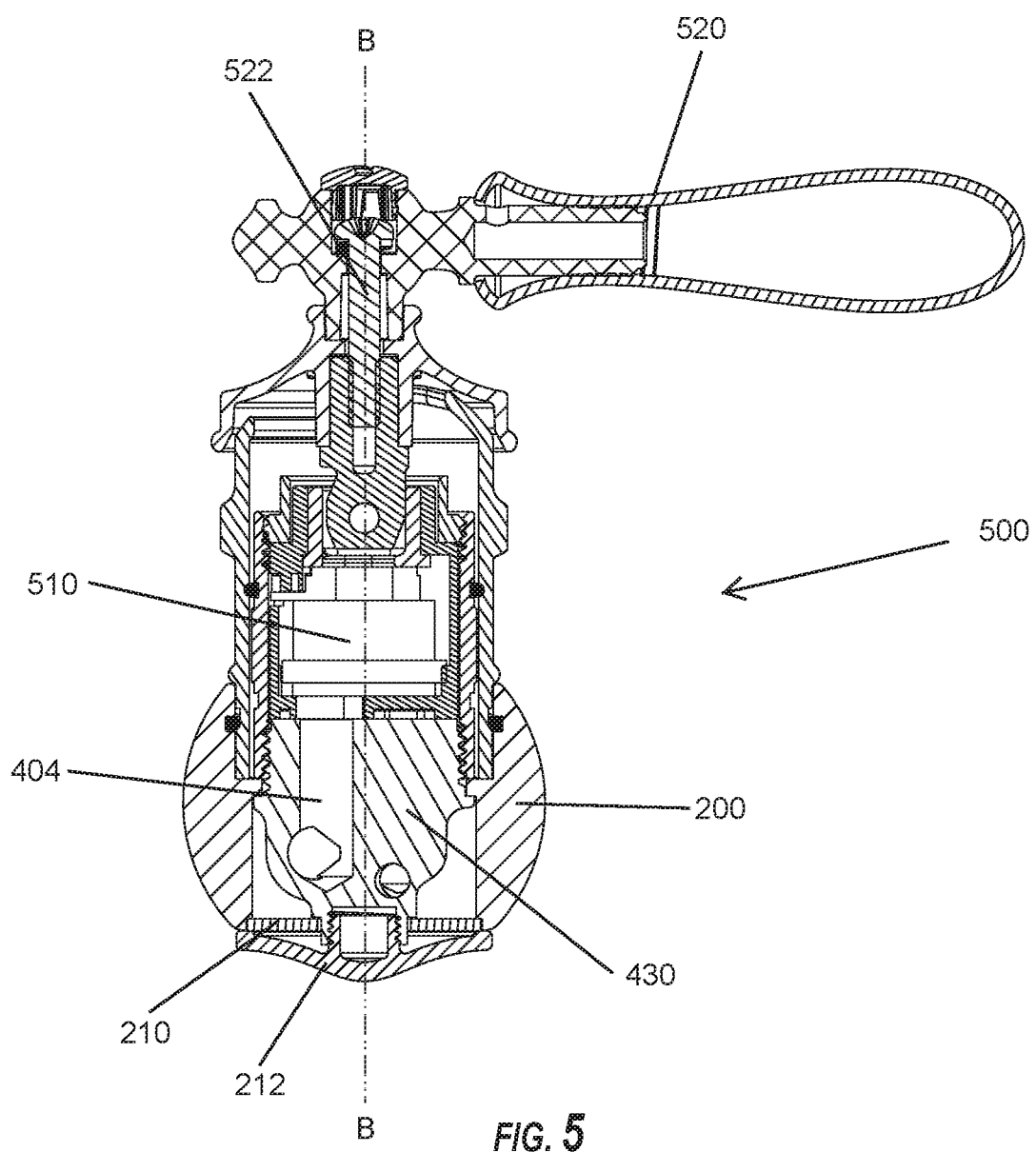
FIG. 5 is a cross-sectional view of a valve assembly taken across line 5-5 in FIG. 1, according to an exemplary embodiment.
Figure 6:
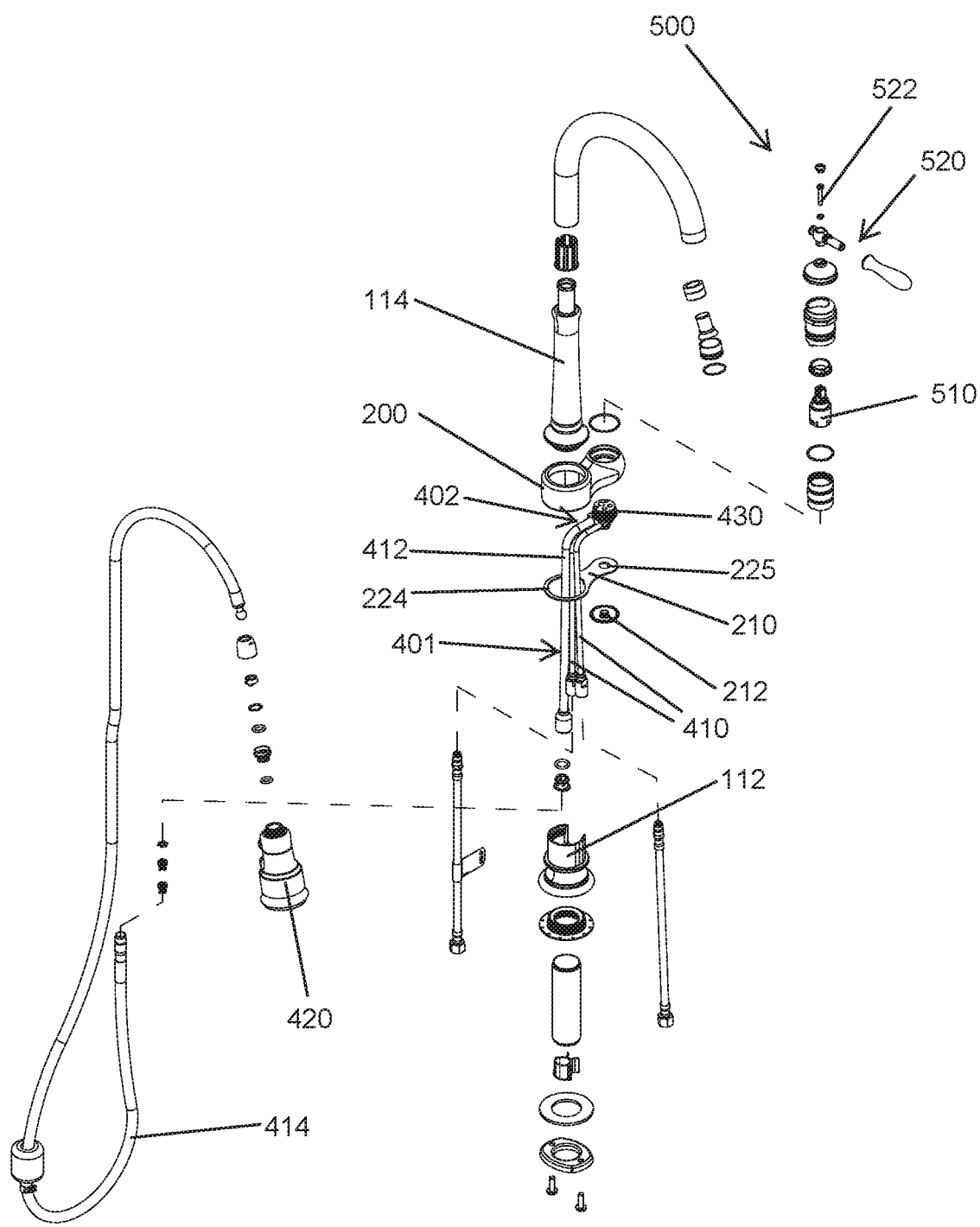
FIG. 6 is an exploded view of a faucet assembly according to an exemplary embodiment.

Referring to FIGS. 4 and 6, the faucet assembly 100 includes at least one water inlet line 410 and at least one water outlet line 412 (collectively, "fluid supply lines 410 and 412"). According to an exemplary embodiment, the fluid supply lines 410 and 412 are rigid, although according to other exemplary embodiments, the fluid supply lines 410 and 412 may be flexible. According to an exemplary embodiment, the faucet assembly 100 includes two water inlet lines 410 and one water outlet line 412. One water inlet line 410 supplies cold water and one water inlet line 410 supplies hot water to the valve 510. As shown in FIG. 4, according to an exemplary embodiment, the at least one water outlet line 412 extends through the base 112 of the faucet body 110 and fluidly connects to a spray head line 414 below the valve assembly 500. As shown in FIG. 3, the spray head line 414 extends through the faucet body 110 to a spray head 420. The spray head line 414 is configured to allow for the spray head 420 to be removed from and returned to the faucet body 110 while maintaining a fluid connection with the at least one water outlet line 412. According to another exemplary embodiment, the at least one water outlet line 412 extends through the neck 114 of the faucet body 110. According to another exemplary embodiment, the at least one water outlet line 412 fluidly couples to a faucet opening without the use of a spray head line such as spray head line 414.

Referring to FIGS. 4-7, the valve 510 is fluidly coupled to the at least one water inlet line 410 and to the at least one water outlet line 412. At least a portion of the valve 510 is disposed within the valve housing 200. According to another exemplary embodiment, the entire valve 510 is disposed within the valve housing 200.

Referring to FIGS. 4 and 6, according to an exemplary embodiment, each of the at least one water inlet line 410 and at least one water outlet line 412 includes at least a first portion 401 and a second portion 402. The first portion 401 extends through at least a portion of the faucet body 110. According to an exemplary embodiment, the first portion 401 extends through at least one of the base 112 and/or the neck 114, substantially parallel to or in line with (i.e., coaxial) the mounting axis A-A. The second portion 402 extends through at least a portion of the valve housing 200. The second portion 402 fluidly connects to the first portion 401. According to an exemplary embodiment, the second portion 402 extends in the direction the valve housing 200 projects from the faucet body 110 (e.g., perpendicularly from the mounting axis A-A or the valve axis B-B).

Figure 7:
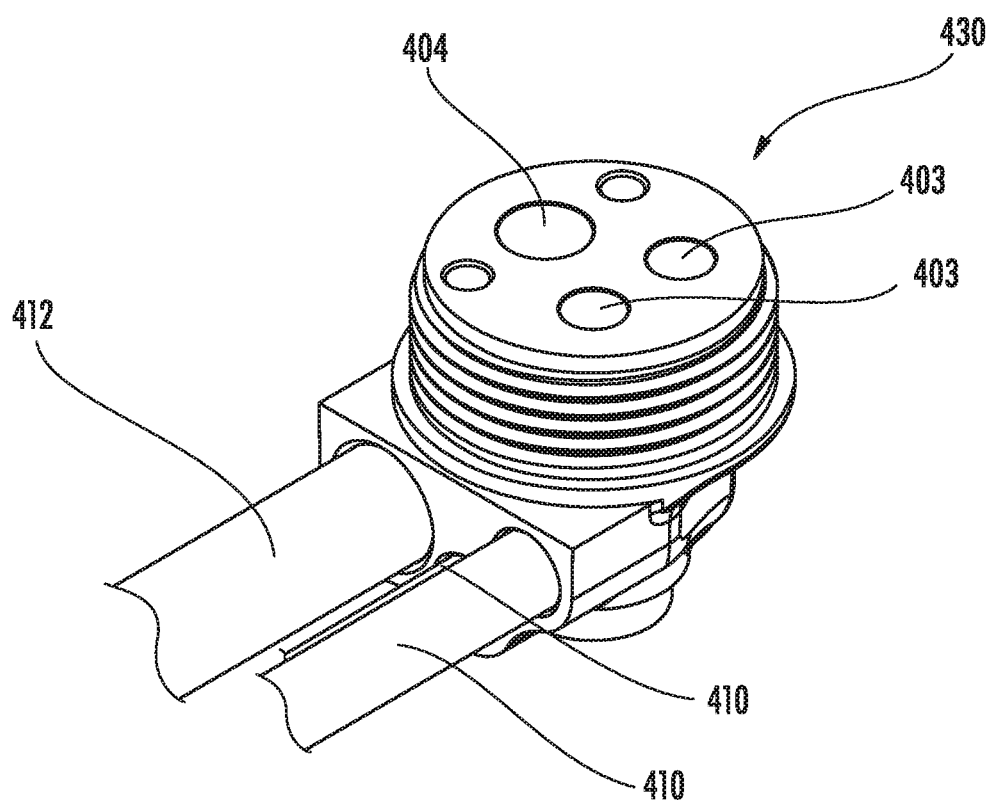
FIG. 7 is a perspective view of a valve connector according to an exemplary embodiment.

Referring to FIGS. 4-7, according to another exemplary embodiment, the faucet assembly 100 includes a valve connector 430. The valve connector 430 defines a plurality of passages. According to an exemplary embodiment, the plurality of passages includes an inlet passage 403 that fluidly connects the at least one water inlet line 410 to the valve 510 and an outlet passage 404 of the valve connector 430 fluidly connects the at least one water outlet line 412 to the valve 510. According to an exemplary embodiment, the plurality of passages are fluidly connected to corresponding openings in the valve 510. The inlet passage 403 reorients a flow of fluid from the second portion 402 of the at least one water inlet line 410 (perpendicular to the valve axis B-B) to an opening in the valve 510 (parallel to the valve axis B-B). The outlet passage 404 reorients a flow of fluid from the valve 510 (parallel to the valve axis B-B) to the second portion 402 of the at least one water outlet line 412 (perpendicular to the valve axis B-B). This configuration allows for a vertically-oriented valve 510 to control fluid flowing in a non-vertical direction in the fluid supply lines 410 and 412. According to another exemplary embodiment, the valve connector 430 defines three passages. For example, as shown in FIG. 7, the valve connector 430 may have two inlet passages 403 fluidly connected to two water inlet lines 410 and may have one outlet passage 404 fluidly connected to one water outlet line 412.

Referring to FIGS. 6 and 8A-8D, the valve housing 200 includes a first (i.e., upper, top, etc.) surface 201 and a second (i.e., lower, bottom, etc.) surface 202. According to an exemplary embodiment, the first surface 201 is the top of the valve housing 200 and the second surface 202 is the bottom of the valve housing 200, forming an opposing side of the valve housing 200. The first surface 201 defines a first opening 221 and a second opening 222. The first opening 221 is formed at a first end 205 of the valve housing 200. The first end 205 is disposed between the base 112 and the neck 114 of the faucet body 110 and is configured to receive at least one of the base 112 and/or the neck 114 such that, for example, a bottom portion of the neck 114 engages the first opening 221. The first end 205 and/or a central axis of the first opening 221 may be coaxial with the mounting axis A-A. According to an exemplary embodiment, the first end 205 receives the upper portion 112a of the base 112. According to an exemplary embodiment, the first end 205 is generally cylindrical, although according to other exemplary embodiments, the first end 205 of the valve housing 200 may be another shape (e.g., generally spherical, conical, elliptical, etc.).

The second opening 222 is formed at the second end 206 of the valve housing 200. The second end 206 and/or a central axis of the second opening 222 may be coaxial with the valve axis B-B. The second opening 222 is configured to receive the valve 510. According to an exemplary embodiment, the valve connector 430 is disposed within the valve housing 200 and beneath the second opening 222. According to an exemplary embodiment, the second end 206 is generally spherical, although according to other exemplary embodiments, the second end 206 of the valve housing 200 may be another shape (e.g., generally cylindrical, conical, elliptical, etc.). The first and second ends of the valve housing 200 are joined by a generally concave profile, although according to other exemplary embodiments, the first end 205 and the second end 206 of the valve housing 200 may be joined by a profile with a different shape (e.g., generally convex, rectangular, triangular, etc.).

Figure 8A:
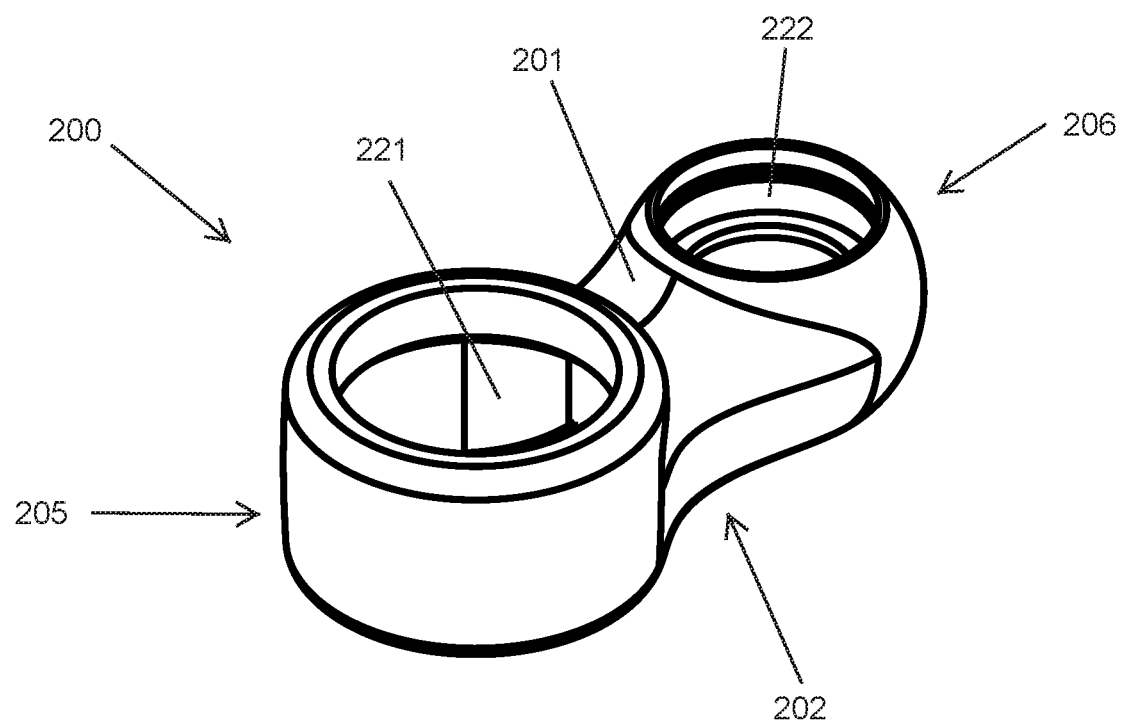
FIG. 8A is a top perspective view of a valve housing according to an exemplary embodiment.
Figure 8B:
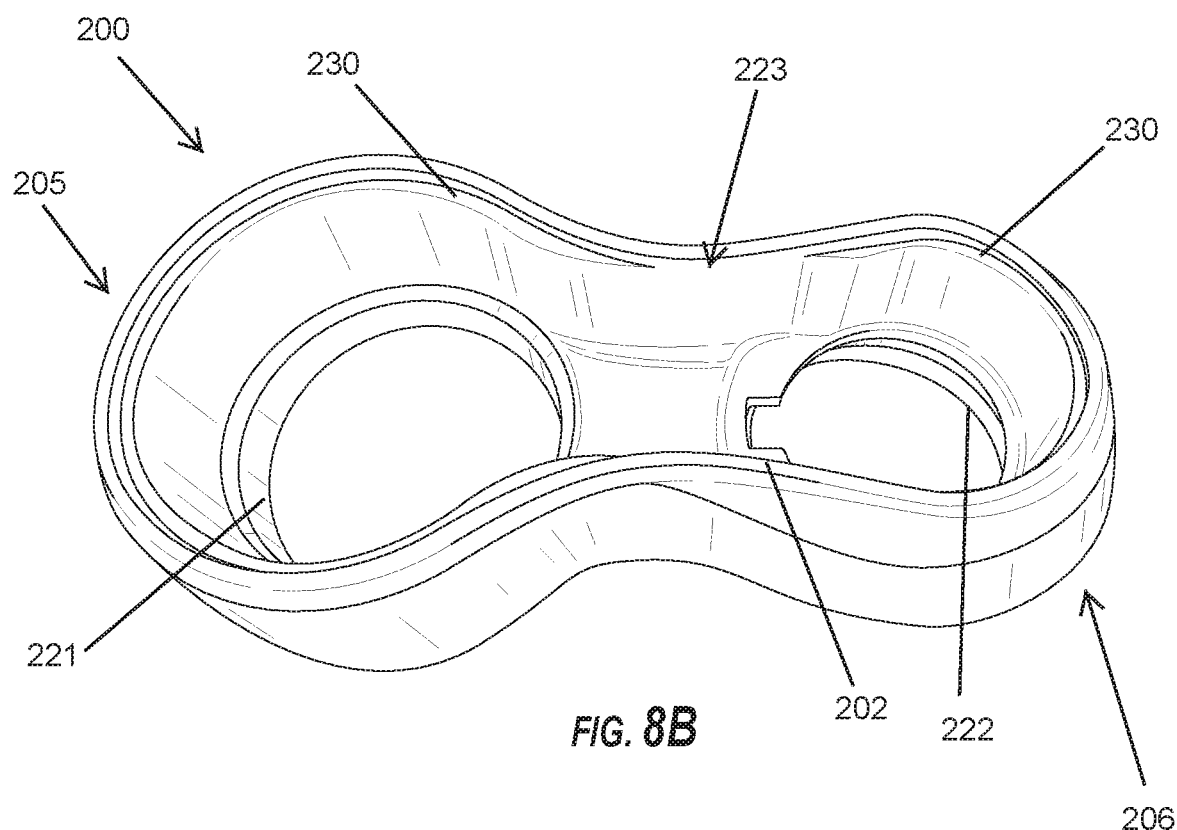
FIG. 8B is a bottom perspective view of a valve housing according to an exemplary embodiment.

As shown in FIG. 8B, the second surface 202 defines a third opening 223. According to an exemplary embodiment, the third opening 223 is generally the shape of an outline of the second surface 202 (two circles joined by a concave portion). According to another exemplary embodiment, the third opening 223 forms another shape (e.g., a rectangle, an ellipse, etc.). The third opening 223 is configured to receive the fluid supply lines 410 and 412. According to another exemplary embodiment, the valve housing 200 includes a lip 230. The lip 230 has generally the same shape as the third opening 223 and is offset from the third opening 223. The lip 230 projects inward from the valve housing 200 between the first surface 201 and the second surface 202, proximate to the third opening 223. The lip 230 may be positioned in the valve housing 200, such that the cap 210 forms a flush surface with the second surface 202. According to another exemplary embodiment, the lip 230 projects from the first end 205 and the second end 206 but does not project along a portion of the valve body 200 therebetween.

Figure 8C:
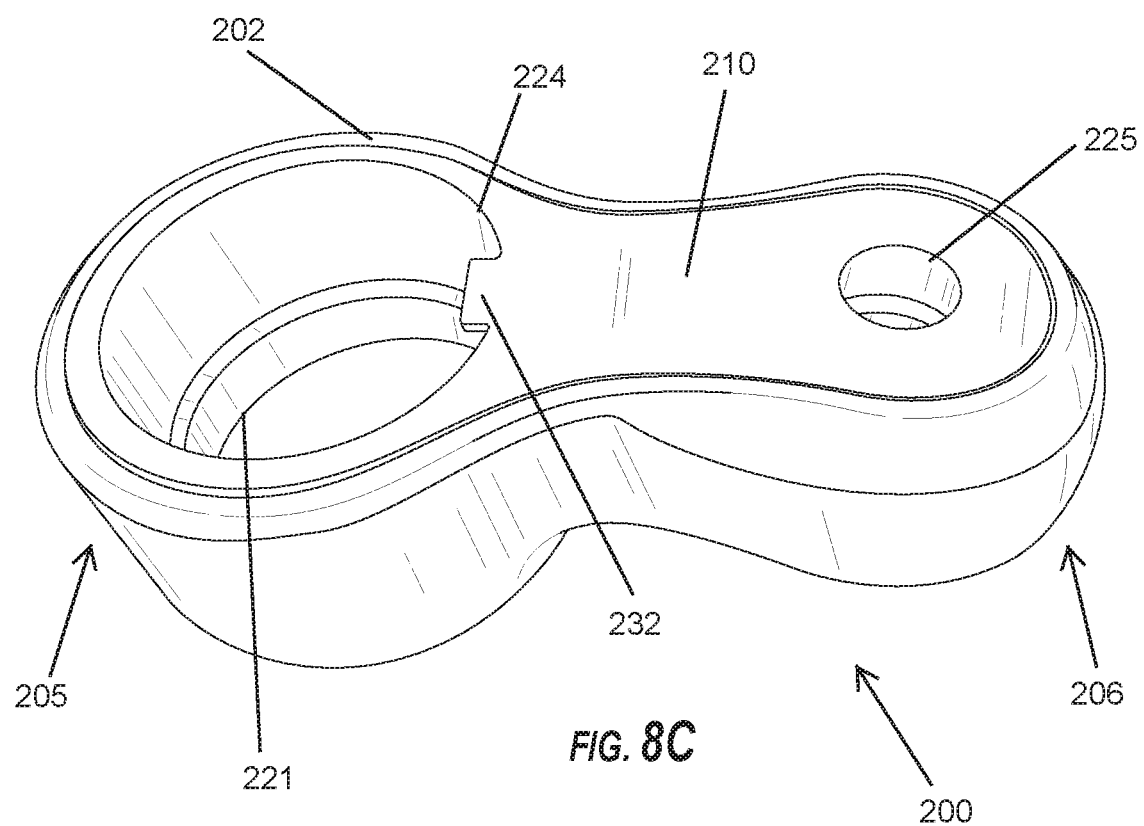
FIG. 8C is a bottom perspective view of a valve housing and a cap according to an exemplary embodiment.

As shown in FIGS. 6 and 8C, the valve housing 200 includes a cap 210. The cap 210 is configured to be received by the third opening 223. The cap 210 has generally the same shape as the third opening 223. According to an exemplary embodiment, when the cap 210 is received in the third opening 223, the cap 210 engages the lip 230 to prevent the cap from being inserted further into the valve housing 200. According to an exemplary embodiment, when the faucet assembly 100 is being assembled, the fluid supply lines 410 and 412 may be inserted through the third opening 223 and then the cap 210 may engage the third opening 223. When the cap 210 is installed in the third opening 223, the cap 210 and the base 112 cover substantially the entire third opening 223.

Figure 8D:
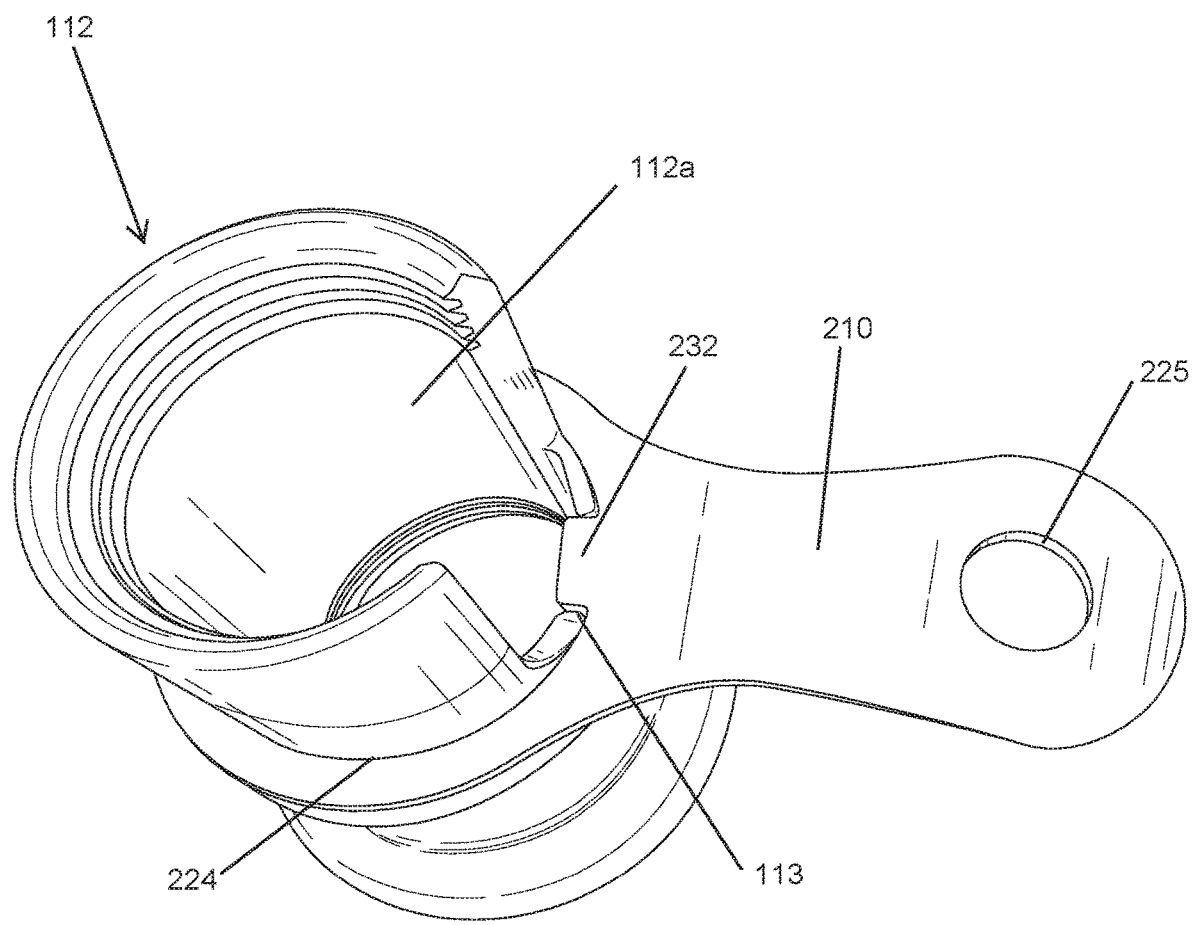
FIG. 8D is a top perspective view of a base and a cap according to an exemplary embodiment.

As shown in FIGS. 8C and 8D, according to an exemplary embodiment, the cap 210 defines a fourth opening 224. According to an exemplary embodiment, the fourth opening 224 is generally circular, although according to other exemplary embodiments, the fourth opening 224 may be other shapes (e.g. rectangular, elliptical, etc.). According to an exemplary embodiment, the fourth opening 224 defines a projection 232. The projection 232 extends into the fourth opening 224 and is configured to engage a corresponding groove 113 in the base 112. The interaction of the projection 232 with the base 112 restricts rotation of the cap 210 and the valve housing 200 around the base 112. According to another exemplary embodiment, the opening 224 may define the groove 113 and the base 112 may define the projection 232. According to an exemplary embodiment, a portion of the base 112 extends through the fourth opening 224 and engages the first end 205 of the valve housing 200. According to an exemplary embodiment, the fourth opening 224 is configured to receive the fluid supply lines 410 and 412. As shown in FIG. 6, the fourth opening 224 receives the first portion 401 of the fluid supply lines 410 and 412. According to an exemplary embodiment, the cap 210 defines a fifth opening 225. The fifth opening 225 may be configured to receive a plug 212. According to an exemplary embodiment, the plug 212 follows the generally spherical shape of the second end of the valve housing 200.

With reference to the exploded view of the faucet 100 shown in FIG. 6, a method of assembling a faucet assembly 100 according to an exemplary embodiment will now be described. In a first step, the fluid supply lines 410 and 412 are inserted through and received in the first opening of the cap 210. In a second step, the second portion 402 of the fluid supply lines 410 and 412 and the valve connector 430 are passed through (i.e., received in, inserted into, etc.) the third opening 223 of the valve housing 200. In a third step, the valve 510 is inserted into the second opening 222 of the valve housing 200. The valve 510 is inserted vertically into the valve housing 200. In a fourth step, the valve connector 430 is fluidly connected to the valve 510. In a fifth step, the cap 210 is received by the third opening 223 of the valve housing 200 and the cap 210 engages the lip 230. In a sixth step, the first portion 401 of the fluid supply lines 410 and 412 is inserted through the base 112. The upper portion 112a of the base 112 extends through the fourth opening 224 of the cap 210. The projection 232 of the cap 210 engages the corresponding groove 113 in the base 112. The upper portion 112a of the base 112 engages the first end 205 of the valve housing 200. In a seventh step, the neck 114 engages the first opening 221 of the valve housing 200. In an eight step, the water outlet line 412 is fluidly connected to the spray head line 414. In a ninth step, the spray head line 414 is fed through the neck 114 of the faucet body 110 and fluidly connected to the spray head 420. According to another exemplary embodiment, the steps for the method of assembling a faucet assembly 100 may be performed in other orders.

According to an exemplary embodiment, a faucet assembly includes a faucet body having a mounting axis in a direction the faucet body projects from a mounting point. The faucet assembly further includes a valve housing projecting from the faucet body and a valve disposed in the valve housing. The valve is configured to rotate about an axis that is parallel to and offset from the mounting axis.

According to another exemplary embodiment, the valve housing projects perpendicularly from the faucet body. According to another exemplary embodiment, the valve is fluidly connected to at least one fluid inlet line and at least one fluid outlet line. According to another exemplary embodiment, the at least one fluid inlet line and at least one fluid outlet line are rigid. According to another exemplary embodiment, the valve housing includes an opening configured to receive the at least one fluid inlet line and at least one fluid outlet line. According to another exemplary embodiment, the valve housing further includes a cap configured to engage the opening. According to another exemplary embodiment, the at least one fluid inlet line and at least one fluid outlet line each includes a first portion configured to extend in the direction of the mounting axis and a second portion configured to extend in a direction that the valve housing projects from the faucet body. According to another exemplary embodiment, the valve is a mixing valve.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A faucet valve assembly, comprising:
    a base having an upper end;
    a valve housing extending from the base and comprising:
        a first side defining a first opening and a second opening; and
        an opposing second side defining a third opening;
        wherein the first opening is configured to receive the upper end of the base; and
        wherein the second opening is configured to receive a valve;
    a valve connector received in a portion of the valve housing defining the second opening, the valve connector comprising first and second inlet passages and an outlet passage;
    a first fluid inlet line configured to be received through the third opening and to fluidly connect to the first inlet passage through a first opening in a first side of the valve connector;
    a second fluid inlet line configured to be received through the third opening and to fluidly connect to the second inlet passage through a second opening in the first side of the valve connector, each fluid inlet line defining a first portion and a second portion, the first portion disposed in the base and the second portion disposed in the valve housing; and
    a fluid outlet line configured to be received through the third opening and to fluidly connect to the outlet passage through a third opening in the first side of the valve connector.

2. The assembly of claim 1, wherein a first portion of the valve is disposed in the second opening and a second portion of the valve extends upwardly beyond the first side of the valve housing, wherein the base defines a passage having a mounting axis; and wherein the valve is configured to rotate about a valve axis substantially parallel to the mounting axis.

3. The assembly of claim 2, wherein:
    a first portion of each fluid inlet line is disposed in the base and extends in a direction of the mounting axis; and
    a second portion of each fluid inlet line extends in a direction that the valve housing extends from the base.

4. The assembly of claim 1, further comprising a neck having a bottom portion, which engages the first opening and couples to the upper end of the base, and a top portion, which extends away from the valve housing.

5. The assembly of claim 1, wherein the valve housing comprises a first portion having a cylindrical shape that defines the first opening and at least a portion of the third opening; and wherein the upper end extends within the first portion.

6. The assembly of claim 5, wherein the valve housing comprises a second portion having a spherical shape that defines the second opening and at least a portion of the third opening.

7. A faucet valve assembly, comprising:
    a base having an upper end;
    a valve housing extending from the base and comprising:
        a first side defining a first opening and a second opening;
        an opposing second side defining a third opening; and
        a cap configured to cover at least a portion of the third opening;
        wherein the first opening is configured to receive the upper end of the base; and
        wherein the second opening is configured to receive a valve;

a valve connector received in a portion of the valve housing defining the second opening, the valve connector comprising first and second inlet passages and an outlet passage;
a first fluid inlet line configured to be received through the third opening and to fluidly connect to the first inlet passage through a first opening in a first side of the valve connector;
a second fluid inlet line configured to be received through the third opening and to fluidly connect to the second inlet passage through a second opening in the first side of the valve connector; and
a fluid outlet line configured to be received through the third opening and to fluidly connect to the outlet passage through a third opening in the first side of the valve connector.

8. The assembly of claim 7, wherein the cap defines a fourth opening configured to receive the first fluid inlet line and the second fluid inlet line therethrough.

9. The assembly of claim 8, wherein the upper end of the base is received in the fourth opening.

10. A faucet valve assembly, comprising:
a base having an upper end;
a valve housing extending from the base and comprising:
    a first side defining a first opening and a second opening, wherein the first opening is defined about a mounting axis and the second opening is defined about a valve axis parallel to the mounting axis;
    an opposing second side defining a third opening;
    wherein the first opening is configured to receive the upper end of the base; and
    wherein the second opening is configured to receive a valve;
a valve connector received in a portion of the valve housing defining the second opening, the valve connector comprising first and second inlet passages and an outlet passage;
a first fluid inlet line configured to be received through the third opening and to fluidly connect to the first inlet passage through a first opening in a first side of the valve connector;
a second fluid inlet line configured to be received through the third opening and to fluidly connect to the second inlet passage through a second opening in the first side of the valve connector; and
a fluid outlet line configured to be received through the third opening and to fluidly connect to the outlet passage through a third opening in the first side of the valve connector.

11. A faucet valve assembly, comprising:
a base having an upper end;
a valve housing extending from the base and comprising:
    a first portion defining a first opening that receives the upper end; and
    a second portion defining a second opening and at least part of a third opening;
    wherein the first portion defines at least part of the third opening;
a valve disposed in the second portion of the valve housing and extending through the second opening;
a first fluid inlet line received through the third opening and fluidly connected to the valve through a first inlet passage within the second portion of the valve housing;
a second fluid inlet line received through the third opening and fluidly connected to the valve through a second inlet passage within the second portion of the valve housing;
a water outlet line in fluid connection with the valve and extending through the valve housing;
a valve connector fluidly connecting the water outlet line and the valve, wherein the valve connector is disposed within the second portion of the valve housing; and
a cap configured to cover at least a portion of the third opening.

12. The assembly of claim 11, wherein the water outlet line comprises a first portion, which is disposed in the base, and a second portion, which extends from the base.

13. The assembly of claim 11, wherein the valve connector comprises:
the first inlet passage that fluidly connects the first fluid inlet line to the valve;
the second inlet passage that fluidly connects the second fluid inlet line to the valve; and
an outlet passage that fluidly connects the water outlet line to the valve.

14. The assembly of claim 13, wherein the first fluid inlet line couples to the first inlet passage through a first opening in a first side of the valve connector, the second fluid inlet line couples to the second inlet passage through a second opening in the first side of the valve connector, and the water outlet line couples to the outlet passage through a third opening in the first side of the valve connector.

15. The assembly of claim 11, wherein the cap defines a fourth opening, which receives each of the fluid inlet line and the water outlet line therethrough, and a fifth opening, which is configured to receive a plug.

16. The assembly of claim 11, wherein the first portion of the valve housing has a cylindrical shape and the second portion of the valve housing has a spherical shape.

* * * * *